US012747620B2

(12) United States Patent
Lee et al.

(10) Patent No.: US 12,747,620 B2
(45) Date of Patent: Sep. 29, 2026

(54) SWING/SLIDING DOOR DEVICE FOR VEHICLE

(71) Applicants: HYUNDAI MOTOR COMPANY, Seoul (KR); Kia Corporation, Seoul (KR); KWANGJIN CO., LTD., Asan-si (KR)

(72) Inventors: Jaeseung Lee, Hwaseong-si (KR); Jinsu Jang, Asan-si (KR); Taeyong Jeon, Asan-si (KR)

(73) Assignees: HYUNDAI MOTOR COMPANY, Seoul (KR); Kia Corporation, Seoul (KR); Kwangjin Co., Ltd., Asan-si (KR)

( * ) Notice: Subject to any disclaimer, the term of this patent is extended or adjusted under 35 U.S.C. 154(b) by 435 days.

(21) Appl. No.: 18/370,676

(22) Filed: Sep. 20, 2023

(65) Prior Publication Data

US 2024/0309691 A1 Sep. 19, 2024

(30) Foreign Application Priority Data

Mar. 14, 2023 (KR) ........................ 10-2023-0033380

(51) Int. Cl.
*E05D 15/48* (2006.01)
*B60J 5/04* (2006.01)
(Continued)

(52) U.S. Cl.
CPC ............ *E05D 15/48* (2013.01); *B60J 5/0477* (2013.01); *B60J 5/0497* (2013.01); *B60J 5/062* (2013.01);
(Continued)

(58) Field of Classification Search
CPC .............. E05D 15/48; E05D 2015/485; E05D 2015/585; E06B 3/4645; E06B 3/4672
(Continued)

(56) References Cited

U.S. PATENT DOCUMENTS 782,139 A * 2/1905 Jones .................... E06B 3/5072 49/257
2,930,332 A * 3/1960 Cook .................. B61D 19/009 49/213
(Continued)

FOREIGN PATENT DOCUMENTS

AU 2018102054 A4 * 1/2019 ............. E05D 15/48
CN 111411868 A * 7/2020 ........... E06B 3/5072
(Continued)

*Primary Examiner* — Catherine A Kelly
(74) *Attorney, Agent, or Firm* — MORGAN, LEWIS & BOCKIUS LLP

(57) ABSTRACT

A swing and sliding door device for a vehicle is provided at a lateral side of a chassis cab of a vehicle to selectively swing or slide and configured to open or close an opening formed in the chassis cab and includes doors hingedly and rotatably connected to cab frames, respectively, provided on a first side portion and a second side portion of the chassis cab, the doors being connected to be slidable in a longitudinal direction of the vehicle along sliding rails provided on at least one of upper and lower portions of the chassis cab so that the doors overlap each other, in which a door frame is provided at a position corresponding to the cab frame and configured to be coupled to or decoupled from an end portion of the door, and in which a door arm sliding assembly is provided on the upper or lower portion of the chassis cab and configured to be coupled to or decoupled from at least one of the doors, the door arm sliding assembly being slidable along the sliding rail.

18 Claims, 29 Drawing Sheets

(51) Int. Cl.

| | |
|---|---|
| ***B60J 5/06*** | (2006.01) |
| ***E05D 15/10*** | (2006.01) |
| *E05C 9/00* | (2006.01) |

(52) U.S. Cl.

CPC ............ *E05D 15/1047* (2013.01); *E05C 9/00* (2013.01); *E05D 2015/485* (2013.01); *E05Y 2201/684* (2013.01); *E05Y 2201/688* (2013.01); *E05Y 2900/516* (2013.01); *E05Y 2900/531* (2013.01)

(58) Field of Classification Search

USPC .................................... 49/127, 129, 130, 150

See application file for complete search history.

(56) References Cited

U.S. PATENT DOCUMENTS

| | | | | | |
|---|---|---|---|---|---|
| 4,000,582 | A * | 1/1977 | Monot | E05D 15/1068 | 49/362 |
| 4,324,072 | A * | 4/1982 | Sterner, Jr. | E05D 15/10 | 49/260 |
| RE31,721 | E * | 11/1984 | Sterner, Jr. | E05D 15/0604 | 49/260 |
| 4,532,673 | A * | 8/1985 | Kim | E05D 15/524 | 16/233 |
| 4,624,074 | A * | 11/1986 | Shuttleworth | B60J 5/062 | 49/222 |
| 5,370,428 | A * | 12/1994 | Dreifert | E05B 63/0052 | 292/161 |
| 5,486,026 | A * | 1/1996 | Borgardt | E05B 65/0876 | 49/141 |
| 5,682,710 | A * | 11/1997 | Davies | E06B 3/5018 | 49/260 |
| 6,161,336 | A * | 12/2000 | Ziv-Av | E05D 15/58 | 49/260 |
| 6,405,781 | B2 * | 6/2002 | Davies | E06B 3/5018 | 160/271 |
| 6,446,696 | B1 * | 9/2002 | Davies | E05D 15/22 | 160/243 |
| 7,165,800 | B2 * | 1/2007 | Thiele | B60P 1/26 | 296/57.1 |
| 7,647,728 | B2 * | 1/2010 | Bortoluzzi | E05D 15/1042 | 49/209 |
| 8,205,387 | B2 * | 6/2012 | Ranaudo | E06B 3/4636 | 49/141 |
| 8,646,208 | B2 * | 2/2014 | Taracko | B60J 5/047 | 49/155 |
| 8,756,865 | B2 * | 6/2014 | Nicholson | E05D 15/48 | 49/180 |
| 8,984,810 | B2 * | 3/2015 | Bortoluzzi | E05D 15/1042 | 49/213 |
| 9,389,011 | B2 * | 7/2016 | Kim | E05D 15/0621 | |
| 9,637,970 | B1 * | 5/2017 | Rendon, Jr. | E06B 3/5054 | |
| 9,739,080 | B2 * | 8/2017 | Yoon | E05D 15/0608 | |
| 9,931,913 | B2 * | 4/2018 | Prevost | E05F 15/646 | |
| 10,280,678 | B1 * | 5/2019 | Rendon, Jr. | E06B 3/509 | |
| 10,415,289 | B2 * | 9/2019 | Hailey | E05D 15/58 | |
| 10,518,616 | B2 * | 12/2019 | Houmani | E05D 15/48 | |
| 10,724,282 | B2 * | 7/2020 | Seo | E05D 15/10 | |
| 11,286,709 | B2 * | 3/2022 | Bernhagen | E05D 15/48 | |
| 11,472,271 | B2 * | 10/2022 | Choi | B60J 5/047 | |
| 11,607,935 | B2 * | 3/2023 | Lee | B60J 5/12 | |
| 11,679,652 | B2 * | 6/2023 | Lee | E05F 15/611 | 296/61 |
| 11,707,972 | B2 * | 7/2023 | Murata | E05B 85/24 | 296/155 |
| 11,808,065 | B2 * | 11/2023 | Lee | E05B 85/04 | |
| 12,173,538 | B2 * | 12/2024 | Zhang | E05D 15/58 | |
| 2003/0218358 | A1 * | 11/2003 | Hahn | B60J 5/06 | 296/155 |
| 2021/0140216 | A1 * | 5/2021 | Choi | E05B 83/40 | |
| 2024/0309688 | A1 * | 9/2024 | Lee | B60J 5/062 | |
| 2024/0309691 | A1 * | 9/2024 | Lee | B60J 5/062 | |

FOREIGN PATENT DOCUMENTS

| | | | | | |
|---|---|---|---|---|---|
| CN | 115434592 | A | * | 12/2022 | E05F 15/611 |
| CN | 115596325 | A | * | 1/2023 | E06B 3/5072 |
| DE | 3814564 | A1 | * | 11/1988 | E05D 15/1081 |
| DE | 102006043495 | A1 | * | 4/2007 | B60P 3/205 |
| EP | 0771718 | A1 | * | 5/1997 | B60P 1/26 |
| ES | 360573 | A1 | * | 7/1970 | B60J 5/062 |
| FR | 2561606 | A1 | * | 9/1985 | B60J 5/062 |
| FR | 2941544 | A3 | * | 7/2010 | E05B 79/20 |
| GB | 426916 | A | * | 4/1935 | E06B 3/50 |
| GB | 778360 | A | * | 7/1957 | E06B 3/5072 |
| GB | 2203184 | A | * | 10/1988 | E05D 15/10 |
| IT | 1117655 | B | * | 2/1986 | E05D 15/523 |
| NO | 930356 | L | * | 8/1993 | E06B 3/5072 |
| WO | WO-2004028884 | A2 | * | 4/2004 | B60J 5/047 |
| WO | WO-2018106197 | A1 | * | 6/2018 | E05D 15/48 |

* cited by examiner

SWING/SLIDING DOOR DEVICE FOR VEHICLE

CROSS-REFERENCE TO RELATED APPLICATION

The present application claims priority to Korean Patent Application No. 10-2023-0033380 filed on Mar. 14, 2023, the entire contents of which is incorporated herein for all purposes by this reference.

BACKGROUND OF THE PRESENT DISCLOSURE

Field of the Present Disclosure

The present disclosure relates to a swing/sliding door device for a vehicle, and more particularly, to a swing/sliding door device for a vehicle, which is configured to open or close a door opening portion of a vehicle body while sliding and swinging forward or rearward in a longitudinal direction of a vehicle.

Description of Related Art

In general, as illustrated in FIG. 1, a delivery vehicle has a chassis cab 2 provided rearward of a driver seat 1 and configured to store items. A lateral side of the chassis cab 2 may be opened or closed by a front sliding door 3 and a rear sliding door 4. The lateral side of the chassis cab 2 is opened as the front sliding door 3 moves rearward in a state in which the rear sliding door 4 is stationary. Alternatively, the lateral side of the chassis cab 2 is opened as the rear sliding door 4 moves forward in a state in which the front sliding door 3 is stationary.

The bidirectional sliding door has the advantage of being inexpensive, lightweight, and simple to open or close. However, the bidirectional sliding doors are structured to slide in a state in which the two doors 3 and 4 overlap each other, which causes a problem in that a loading space in the chassis cab 2 decreases to that extent. Furthermore, because an opening width may be ensured only by a width of one door, it is difficult to load or unload items into or from the chassis cab 2 in case that the items are large in volume. Furthermore, it is not easy to ensure watertightness between the front sliding door 3 and the rear sliding door 4.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a swing/sliding door for a vehicle, which is provided at a lateral side of a chassis cab of a vehicle and is configured for sliding and swinging, which may suppress a loss of item storage space and ensure an opening width.

Various aspects of the present disclosure are directed to providing a swing and sliding door device provided at a lateral side of a chassis cab of a vehicle to selectively swing or slide and configured to open or close an opening formed in the chassis cab, the swing and sliding door device including: doors hingedly and rotatably connected to cab frames, respectively, provided on a first side portion and a second side portion of the chassis cab, the doors being connected to be slidable in a longitudinal direction of the vehicle along sliding rails provided on at least one of upper and lower portions of the chassis cab so that the doors overlap each other, in which a door frame is provided at a position corresponding to the cab frame and configured to be coupled to or decoupled from an end portion of the door, and in which a door arm sliding assembly is provided on the upper or lower portion of the chassis cab and configured to be coupled to or decoupled from the doors, the door arm sliding assembly being slidable along the sliding rail.

The cab frame may include a door hinge connected to the door frame, and the door frame may hingedly rotate relative to the cab frame by the door hinge.

The door frame may include a door striker, and the door may include a door latch provided at a position corresponding to the door striker and configured to be coupled to or decoupled from the door striker.

The door may include a sliding handle portion that operates the door so that the door swings about the cab frame or does not swing.

The door may include a hinge catcher that operates so that the door is coupled to or decoupled from the door frame in conjunction with an operation of the sliding handle portion.

A cable may be connected to the hinge catcher, and the cable may move the hinge catcher in a direction perpendicular to a longitudinal direction of a vehicle body when tension is applied to the cable by operation of the sliding handle portion.

The cable may include a lever, and the lever may come into contact with and rotate the door striker when the cable moves toward a lower side of the vehicle so that the door striker is decoupled from the door latch.

The door arm sliding assembly may include: a door arm configured to move along the sliding rail; and a door arm bracket connected to the door arm and configured to be fixed to or released from the door.

A door roller may be provided on a lower surface of the door arm and configured to come into contact with the sliding rail and roll in accordance with a sliding motion of the door.

The sliding rail may be provided as a pair of sliding rails, and the sliding rail may include a shape curved rearward toward the cab frame.

The door may include a swing handle portion that operates the door so that the door slides along the sliding rail or does not slide.

The door may include a door fixing bar configured to move in a longitudinal direction of a vehicle body so that the door is fixed to or released from the door arm sliding assembly in conjunction with an operation of the swing handle portion.

A cable may be connected to the door fixing bar, and the cable may move the door fixing bar in the longitudinal direction of the vehicle body when tension is applied to the cable by operation of the swing handle portion.

The door fixing bar may include a plurality of locking pins, and the locking pin may be coupled to or decoupled from the door arm sliding assembly by a movement of the door fixing bar.

The plurality of locking pins may be inserted into or released from a locking pinhole provided in a door arm bracket of the door arm sliding assembly.

Various aspects of the present disclosure are directed to providing a swing and sliding door device provided at a lateral side of a chassis cab of a vehicle to selectively swing or slide and configured to open or close an opening formed in the chassis cab, the swing and sliding door device including: a first door hingedly and rotatably connected to a cab frame provided on a first side portion of the chassis cab, the first door being connected to be slidable along sliding rails provided on upper and lower portions of the chassis cab; a second door hingedly and rotatably connected to a cab frame provided on a second side portion of the chassis cab, the second door being connected to be slidable along sliding rails provided on the upper and lower portions of the chassis cab; door strikers provided on door frames provided at positions corresponding to the cab frames; door latches provided at positions corresponding to the door strikers and provided on the first and second doors, the door latches being coupled to or decoupled from the door strikers; door arm sliding assemblies provided on the upper or lower portion of the chassis cab and configured to be coupled to or decoupled from the first and second doors, the door arm sliding assemblies being provided to be slidable along the sliding rails; and door fixing bars configured to move in a longitudinal direction of a vehicle body so that the first and second doors are fixed to or released from the door arm sliding assemblies.

The first and second doors may include: swing handle portions configured to operate the first and second doors so that the first and second doors slide along the sliding rails or do not slide; and sliding handle portions configured to operate the first and second doors so that the first and second doors swing about the cab frames or do not swing.

A B-pillar may be provided on a center portion of the chassis cab, and the B-pillar may extend in an upward/downward direction of the vehicle body and be configured to be detached from the chassis cab or rotate.

Ends of the first and second doors, which face each other, may be coupled to the B-pillar with a door seal interposed therebetween.

According to the exemplary embodiment of the present disclosure, the door, which may slide and swing, is applied to the vehicle including the chassis cab configured for storing items. Therefore, the door open regions may be diversified, and the door opening width may be maximized so that items with various sizes may be loaded or unloaded, improving the usability.

Furthermore, the door may slide along the sliding rail including a curved shape, which may minimize a loss of the item storage space in the chassis cab and allow the item storage space to store a larger number of items.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
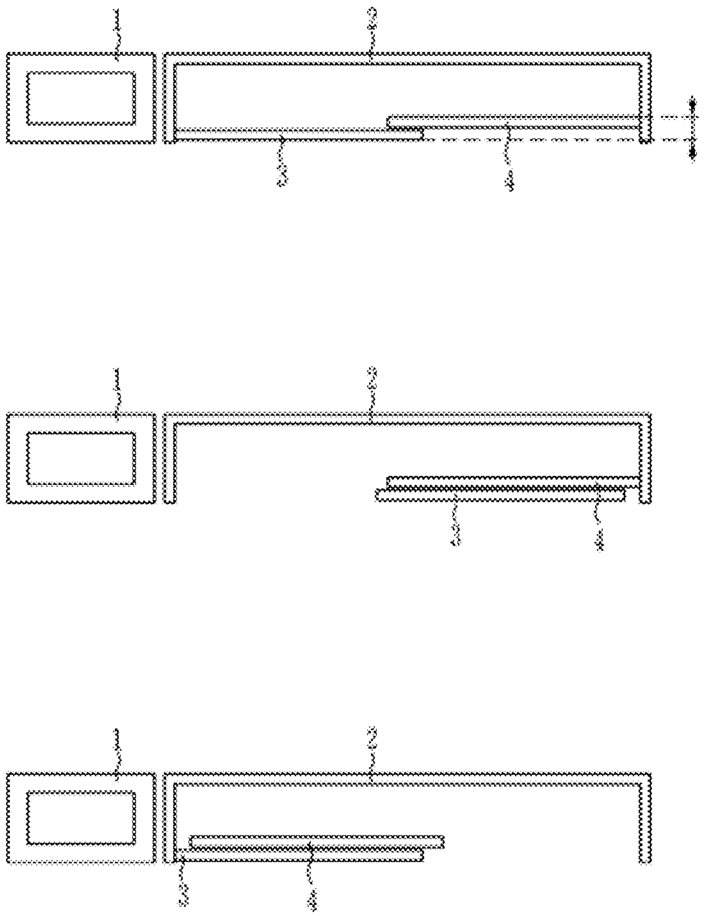
FIG. 1 (Prior Art)
FIG. 1 is a view exemplarily illustrating a process of opening a door of a vehicle including a chassis cab in the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings so that those with ordinary skill in the art to which an exemplary embodiment of the present disclosure pertains may easily carry out the embodiments. The present disclosure may be implemented in various different ways and is not limited to the exemplary embodiments described herein.

Furthermore, the constituent elements having the same configurations in several embodiments will be assigned with the same reference numerals and described only in the representative embodiment, and only the constituent elements, which are different from the constituent elements according to the representative embodiment, will be described in other exemplary embodiments of the present disclosure.

It is noted that the drawings are schematic and are not illustrated based on actual scales. Relative dimensions and proportions of parts illustrated in the drawings are exaggerated or reduced in size for clarity and convenience in the drawings, and any dimension is just illustrative but not restrictive. The same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

The exemplary embodiment of the present disclosure specifically illustrates an example of the present disclosure. As a result, various modifications of the drawings are expected. Therefore, the embodiments are not limited to specific forms in regions illustrated in the drawings, and for example, include modifications of forms by the manufacture thereof.

Hereinafter, a structure of a sliding door device for a vehicle according to various exemplary embodiments of the present disclosure will be described in detail with reference to the accompanying drawings.

Figure 2:
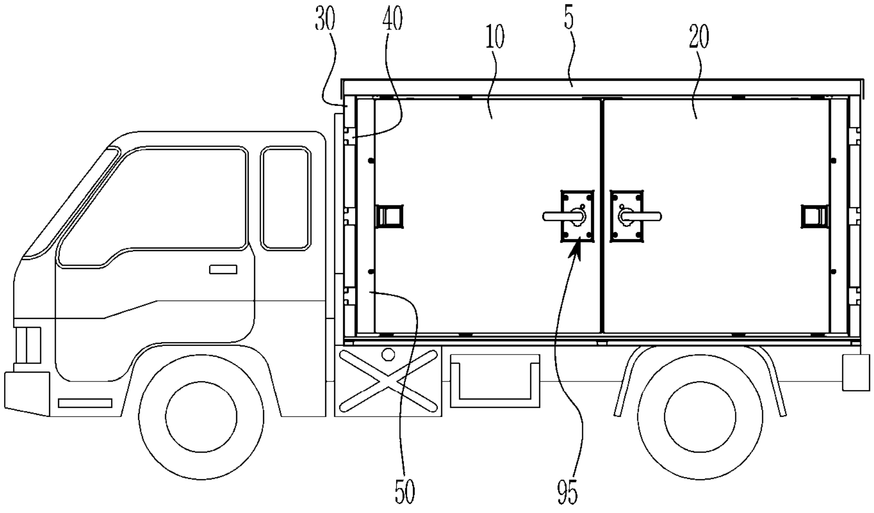
FIG. 2 is a view exemplarily illustrating a vehicle to which a swing/sliding door device for a vehicle according to various exemplary embodiments of the present disclosure is applied.
Figure 3A:
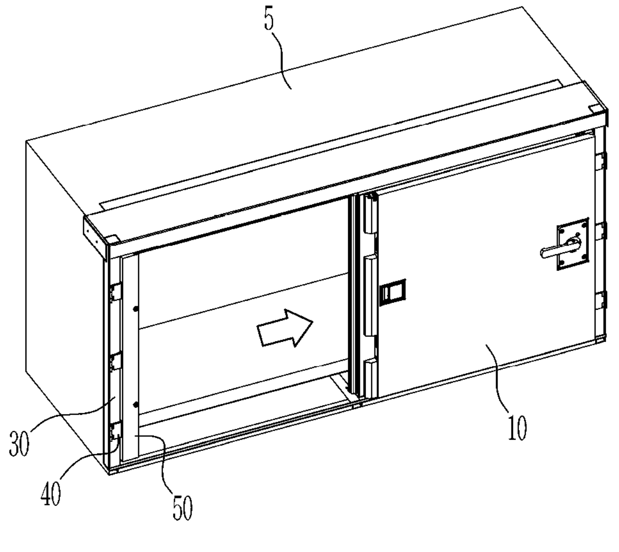
FIG. 3A and FIG. 3B are views exemplarily illustrating a state in which a door of the swing/sliding door device for a vehicle according to the exemplary embodiment of the present disclosure slides.
Figure 3B:
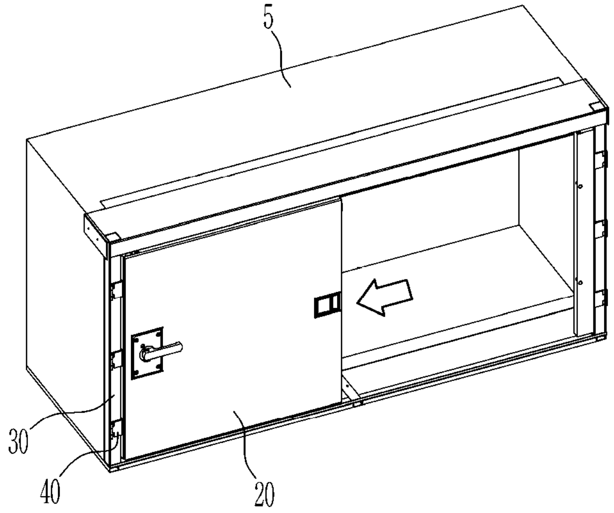
Figure 4:
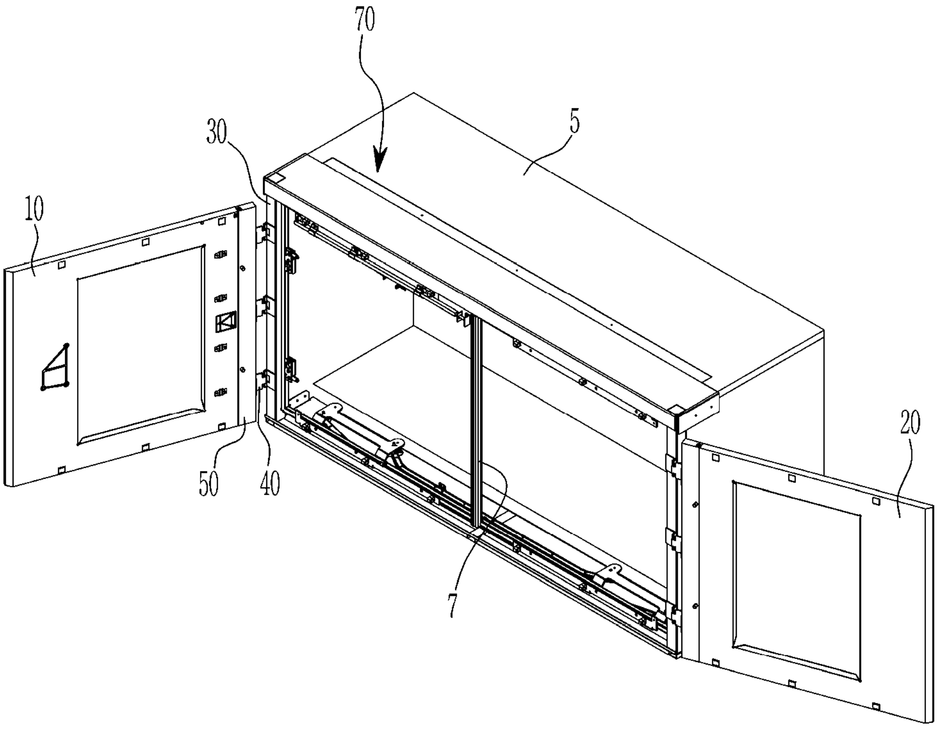
FIG. 4 is a view exemplarily illustrating a state in which the door of the swing/sliding door device for a vehicle according to the exemplary embodiment of the present disclosure swings.

FIG. 2 is a view exemplarily illustrating a vehicle to which a swing/sliding door device for a vehicle according to various exemplary embodiments of the present disclosure is applied, FIG. 3 is a view exemplarily illustrating a state in which a door of the swing/sliding door device for a vehicle according to the exemplary embodiment of the present disclosure slides, and FIG. 4 is a view exemplarily illustrating a state in which the door of the swing/sliding door device for a vehicle according to the exemplary embodiment of the present disclosure swings.

With reference to FIG. 2, FIG. 3 and FIG. 4, a swing/sliding door device for a vehicle according to various exemplary embodiments of the present disclosure may be provided at a lateral side of a chassis cab 5 of a vehicle in a slidable/swingable manner and open or close an opening formed at the lateral side of the chassis cab 5.

The sliding door device for a vehicle according to the exemplary embodiment of the present disclosure includes a first door 10 and a second door 20. The first door 10 and the second door 20 may be hingedly and rotatably connected to cab frames 30 provided at two opposite sides of the chassis cab 5 so that the first door 10 and the second door 20 may slide between the cab frames 30.

As illustrated in FIG. 3A, the first door 10 may slide toward the second door 20 which is stationary. As illustrated in FIG. 3B, the second door 20 may slide toward the first door 10 which is stationary. That is, the door, which slides, toward an upper surface of the door which is stationary. The first door 10 and the second door 20 may be connected to sliding rails 90 provided on upper and lower portions of the chassis cab 5 so that the first door 10 and the second door 20 may slide along the sliding rails 90.

As illustrated in FIG. 4, the first door 10 and the second door 20 may be hingedly and rotatably connected to the cab frames 30 provided at the lateral side of the chassis cab 5. To the present end, door frames 50 may be provided at positions corresponding to the cab frames 30. The door frames 50 may be connected to an end portion of the first door 10 and an end portion of the second door 20. The door frames 50 may be connected to the cab frames 30 by door hinges 40. The door frames 50 hingedly rotate relative to the cab frames 30 by the door hinges 40 so that the first door 10 and the second door 20 may swing.

Figure 5:
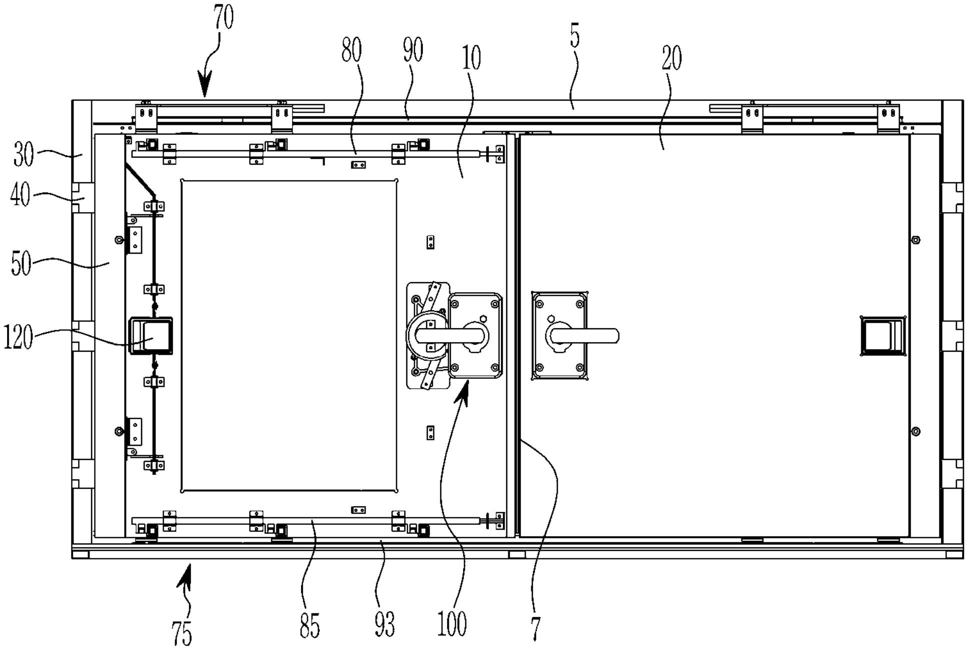
FIG. 5 is a view exemplarily illustrating the swing/sliding door device for a vehicle according to the exemplary embodiment of the present disclosure.
Figure 6:
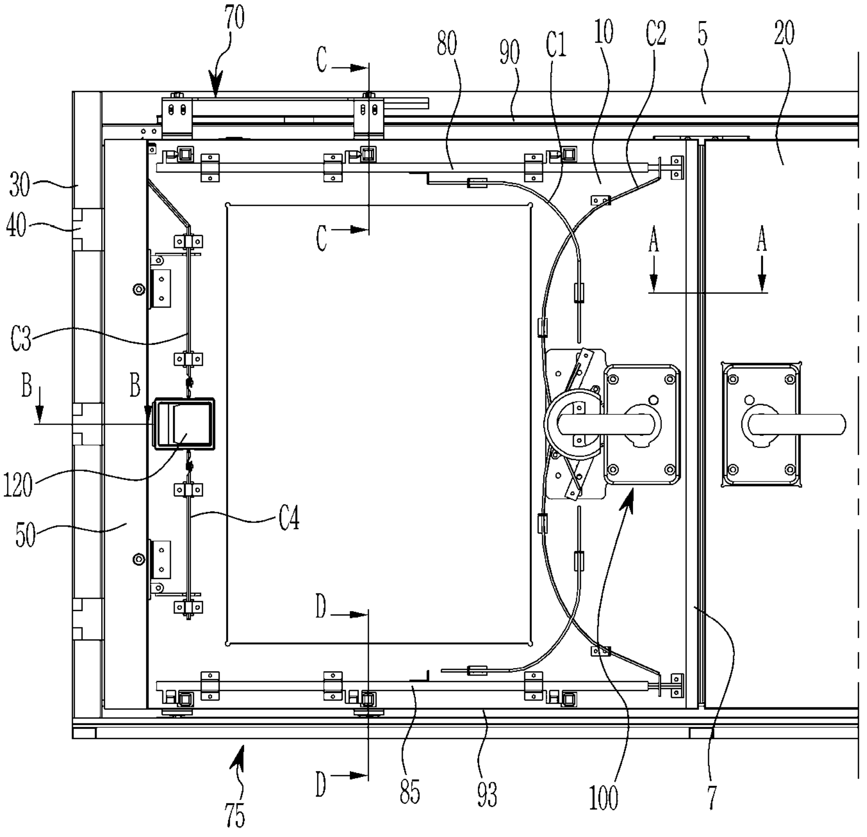
FIG. 6 is a view exemplarily illustrating a state in which cables of the swing/sliding door device for a vehicle according to the exemplary embodiment of the present disclosure are connected.

FIG. 5 is a view exemplarily illustrating the swing/sliding door device for a vehicle according to the exemplary embodiment of the present disclosure, and FIG. 6 is a view exemplarily illustrating a state in which cables of the swing/sliding door device for a vehicle according to the exemplary embodiment of the present disclosure are connected.

With reference to FIG. 5 and FIG. 6, the swing/sliding door device for a vehicle according to the exemplary embodiment of the present disclosure includes the cab frames 30 provided at the two opposite sides of the chassis cab 5, and the sliding rails 90 and 93 provided at the upper and lower portions of the chassis cab 5.

The door frames 50 may be provided at the positions corresponding to the cab frames 30. The door frames 50 may be coupled to or decoupled from the end portion of the first door 10 and the end portion of the second door 20. The door hinge 40 may be provided on the cab frame 30 and connected to the door frame 50. The door frame 50 may hingedly rotate relative to the cab frame 30 by the door hinge 40.

Furthermore, door strikers 62 may be provided on the door frames 50. Door latches 60 may be provided on the first door 10 and the second door 20 and disposed at positions corresponding to the door strikers 62. The door latch 60 may be coupled to or decoupled from the door striker 62. When the doors 10 and 20 swing, the door strikers 62 and the door latches 60 may be kept in coupled states. When the doors 10 and 20 slide, the door strikers 62 and the door latches 60 may be decoupled.

Door arm sliding assemblies 70 and 75 may be provided on the upper and lower portions of the chassis cab 5. The door arm sliding assemblies 70 and 75 may be coupled to or decoupled from the first door 10 and the second door 20 and configured to slide along the sliding rails 90 and 93.

When the doors 10 and 20 slide, the door arm sliding assemblies 70 and 75 are kept coupled to the doors 10 and 20. When the doors 10 and 20 swing, the door arm sliding assemblies 70 and 75 are decoupled from the doors 10 and 20. To the present end, door fixing bars 80 and 85 may be provided on the first and second doors 10 and 20. The door fixing bars 80 and 85 may move in a longitudinal direction of a vehicle body so that the first and second doors 10 and 20 may be fixed to or released from the door arm sliding assemblies 70 and 75. That is, when the doors 10 and 20 slide, the door fixing bars 80 and 85 are coupled to the door arm sliding assemblies 70 and 75. When the doors 10 and 20 swing, the door fixing bars 80 and 85 are decoupled from the door arm sliding assemblies 70 and 75.

The first and second doors 10 and 20 have sliding handle portions 120 that operate the first and second doors 10 and 20 so that the first and second doors 10 and 20 swing about the cab frames 30 or do not swing. The first and second doors 10 and 20 have swing handle portions 100 that operate the first and second doors 10 and 20 so that the first and second doors 10 and 20 slide along the sliding rails 90 and 93 or do not slide.

The swing handle portions 100 rotate to move the door fixing bars 80 and 85 in the longitudinal direction of the vehicle body so that the door fixing bars 80 and 85 are decoupled from the door arm sliding assemblies 70 and 75. As the door fixing bars 80 and 85 are decoupled from the door arm sliding assemblies 70 and 75, the doors 10 and 20 may swing. Furthermore, for example, the sliding handle portions 120 are pulled so that the end portions of the doors 10 and 20 are decoupled from the door frames 50. Therefore, the doors 10 and 20 may slide.

Cables C1 and C2 may be connected to the swing handle portion 100 and the door fixing bars 80 and 85. Tension is applied to the cables C1 and C2 when the swing handle portion 100 rotates so that the door fixing bars 80 and 85 may move.

Furthermore, cables C3 and C4 are provided on the sliding handle portion 120 and connected to a hinge catcher 122. Tension is applied to the cables C3 and C4 by operation of the sliding handle portion 120 so that the hinge catcher 122 may move in a direction perpendicular to the longitudinal direction of the vehicle body.

Figure 7:
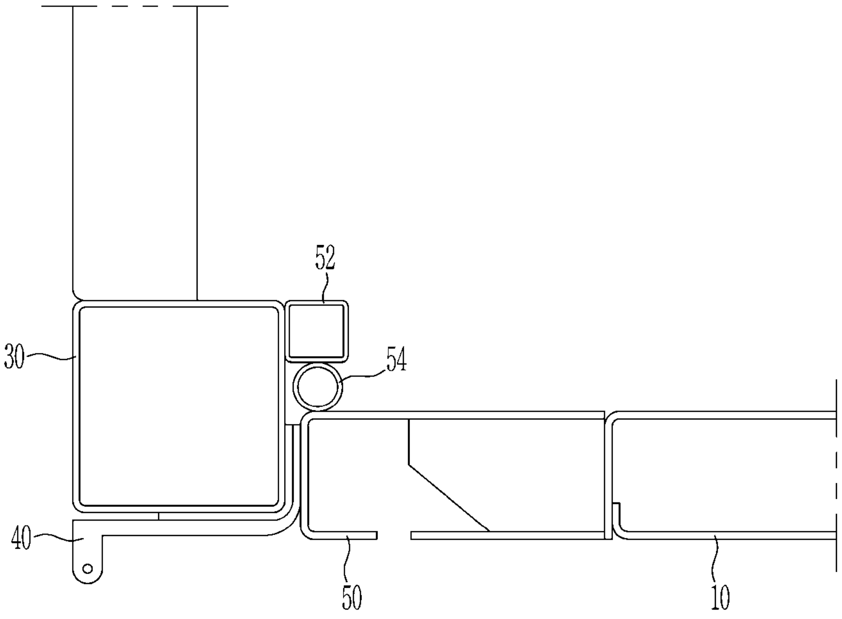
FIG. 7 is a cross-sectional view taken along line 'B-B' in FIG. 6.

FIG. 7 is a cross-sectional view taken along line 'B-B' in FIG. 6.

With reference to FIG. 7, the door hinge 40 is provided on the cab frame 30, and the door hinge 40 is connected to the door frame 50. The door frame 50 may hingedly rotate relative to the cab frame 30 by the door hinge 40, and the first door 10 may be inserted into and coupled to the door frame 50 or decoupled from the door frame 50.

The first door 10, together with the door frame 50, may hingedly rotate relative to the cab frame 30 when the first door 10 is coupled to the door frame 50. Meanwhile, a body seal 54 may be provided between the cab frame 30 and the door frame 50 to mitigate impact caused by the hinged rotation of the door frame 50 relative to the cab frame 30. An opening frame 52 may be provided to restrict the hinged rotation. The above-mentioned structure of the first door 10 may be applied to the second door 20 in the same manner.

Figure 8:
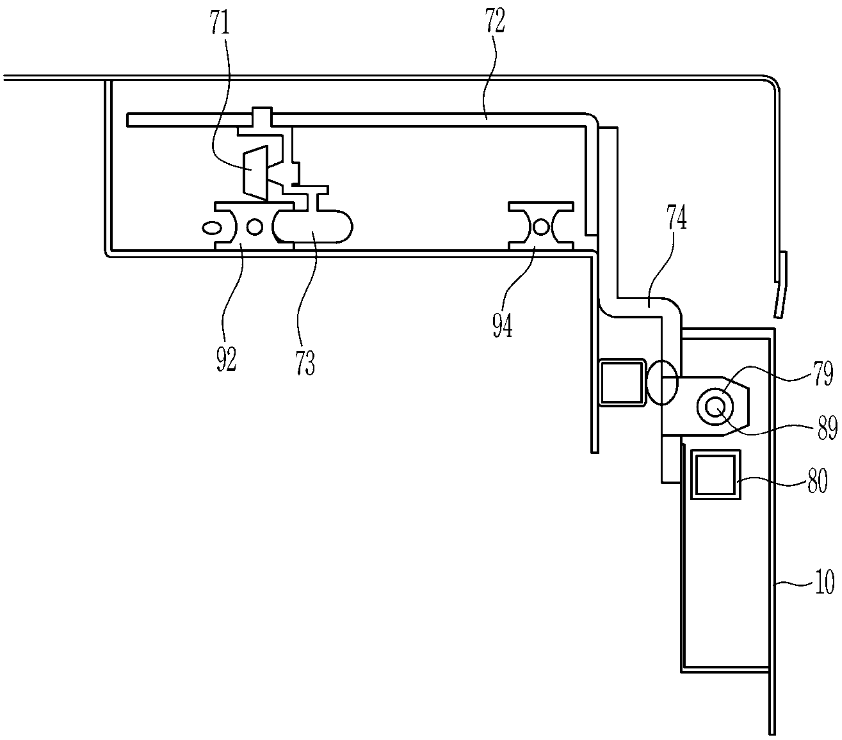
FIG. 8 is a cross-sectional view taken along line 'C-C' in FIG. 6.
Figure 9:
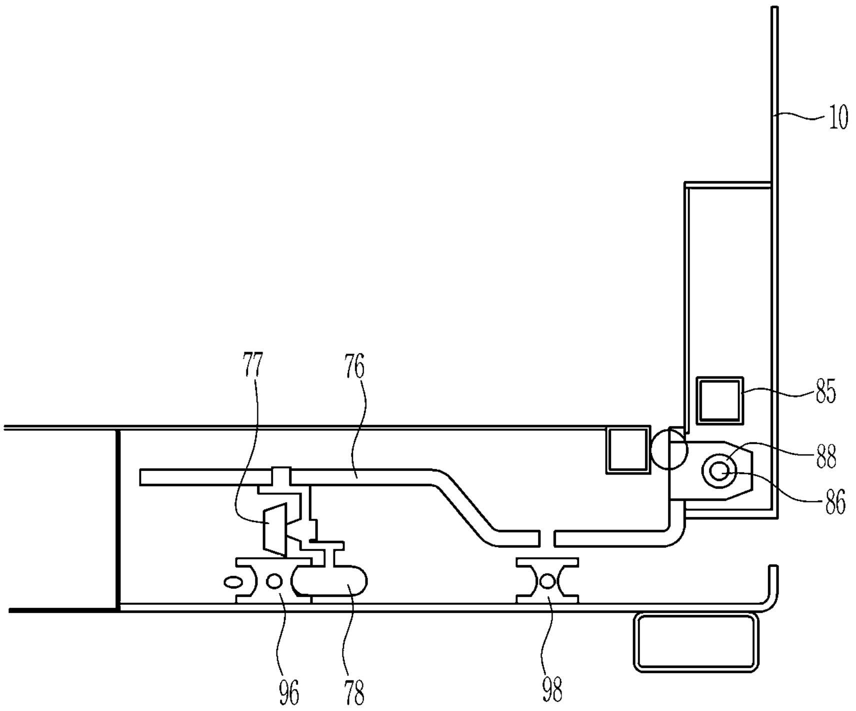
FIG. 9 is a cross-sectional view taken along line 'D-D' in FIG. 6.

FIG. 8 is a cross-sectional view taken along line 'C-C' in FIG. 6, and FIG. 9 is a cross-sectional view taken along line 'D-D' in FIG. 6.

With reference to FIG. 8, the door arm sliding assembly 70 provided at an upper side of the first door 10 includes a door arm 72 and a door arm bracket 74. A door roller 73 is provided on a lower surface of the door arm 72. The door roller 73 may roll by being in contact with sliding rails 92 and 94 in accordance with the sliding motion of the first door 10. The sliding rail 90 may be provided as a pair of sliding rails 92 and 94 and each include a shape curved rearward toward the cab frame 30. Meanwhile, a roller 71 may be further provided on the door arm 72. The roller 71 may be in contact with an external portion of the sliding rail 92 and roll.

The door arm bracket 74 connected to the door arm 72 is configured to be fixed to or released from the door arm 72. The door arm bracket 74 includes a locking pinhole 79. A locking pin 89 provided on the door fixing bar 80 provided at the upper side of the first door 10 may be inserted into the locking pinhole 79. When the locking pin 89 is inserted into and fixed to the locking pinhole 79, the door arm sliding assembly 70 and the first door 10 are kept in a connected state so that the first door 10 may slide. Furthermore, when the locking pin 89 is unlocked from the locking pinhole 79, the connected state between the door arm sliding assembly 70 and the first door 10 is released so that the first door 10 may swing.

The structure of the door arm sliding assembly 70 provided at the upper side of the first door 10 may be applied to an upper side of the second door 20 in the same manner.

With reference to FIG. 9, the door arm sliding assembly 75 provided at a lower side of the first door 10 includes a door arm 76. A door roller 78 is provided on a lower surface of the door arm 76. The door roller 78 may be in contact with sliding rails 96 and 98 and roll in accordance with the sliding motion of the first door 10. The sliding rail 93 may be provided as a pair of sliding rails 96 and 98 and each include a shape curved rearward toward the cab frame 30. Meanwhile, a roller 77 may be further provided on the door arm 76. The roller 77 may be in contact with an external portion of the sliding rail 96 and roll.

The door arm 76 includes a locking pinhole 88. A locking pin 86 formed in the door fixing bar 85 provided at the lower side of the first door 10 may be inserted into or released from the locking pinhole 88.

The structure of the door arm sliding assembly 75 provided at the lower side of the first door 10 may be applied to a lower side of the second door 20 in the same manner.

Figure 10:
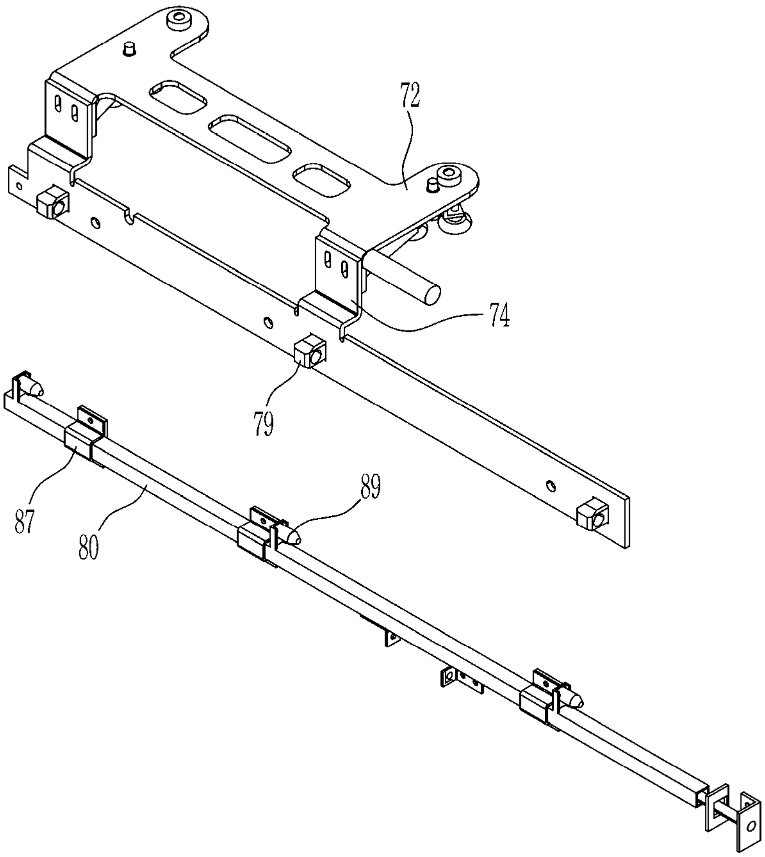
FIG. 10 is a view exemplarily illustrating a coupling relationship between a door fixing bar and a door arm sliding assembly of the swing/sliding door device for a vehicle according to the exemplary embodiment of the present disclosure.

FIG. 10 is a view exemplarily illustrating a coupling relationship between the door fixing bar and the door arm sliding assembly of the sliding door device for a vehicle according to the exemplary embodiment of the present disclosure.

With reference to FIG. 10, the door arm sliding assembly 70 includes the door arm 72 configured to move along the sliding rail 90, and the door arm bracket 74 connected to the door arm 72 and configured to be fixed to or released from the first and second doors 10 and 20. The door fixing bars 80 provided on the first and second doors 10 and 20 may be connected to or disconnected from the door arm bracket 74. The door fixing bar 80 may be fixed to the doors 10 and 20 by a fixing bracket 87. When the locking pin 89 provided on the door fixing bar 80 is inserted into or released from the locking pinhole 79 provided in the door arm bracket 74, the door arm bracket 74 and the first and second doors 10 and 20 may be connected or disconnected.

Figure 11:
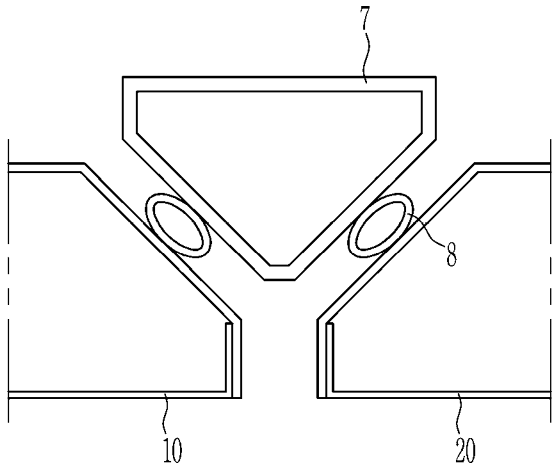
FIG. 11 is a cross-sectional view taken along line 'A-A' in FIG. 6.

FIG. 11 is a cross-sectional view taken along line 'A-A' in FIG. 6.

With reference to FIG. 11, a B-pillar 7 may be provided on a center portion of the chassis cab 5. The B-pillar 7 may extend in an upward/downward direction of the vehicle body and be configured to be detached from the chassis cab 5 or rotate. End portions of the first and second doors 10 and 20, which face each other, may be coupled to the B-pillar 7 with a door seal 8 interposed therebetween. When the first and second doors 10 and 20 slide and swing, the first and second doors 10 and 20 are separated from the door seal 8 and separated from the B-pillar 7.

FIG. 12A, FIG. 12B, FIG. 12C, FIG. 12D, FIG. 12E, FIG. 12F, FIG. 12G, and FIG. 12H are views exemplarily illustrating a process in which the door of the sliding door device for a vehicle according to the exemplary embodiment of the present disclosure swings.

Figure 12A:
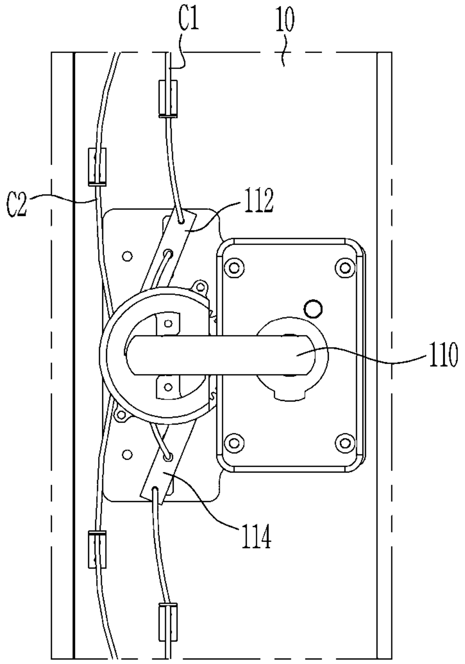
FIG. 12A, FIG. 12B, FIG. 12C, FIG. 12D, FIG. 12E, FIG. 12F, FIG. 12G, and FIG. 12H are views exemplarily illustrating a process in which the door of the swing/sliding door device for a vehicle according to the exemplary embodiment of the present disclosure swings.

With reference to FIG. 12A, FIG. 12B, FIG. 12C, FIG. 12D, FIG. 12E, FIG. 12F, FIG. 12G, and FIG. 12H, the first and second doors 10 and 20 may include the swing handle portions 100 that operate the first and second doors 10 and 20 so that the first and second doors 10 and 20 may slide or may not slide. Furthermore, the cables C1 and C2, to which tension is applied by operation of the swing handle portion 100, may be connected to the swing handle portion 100 (FIG. 12A). The cables C1 and C2 are connected to the door fixing bars 80 and 85 that move in the longitudinal direction of the vehicle body so that each of the first and second doors 10 and 20 is fixed to or released from the door arm sliding assemblies 70 and 75.

Figure 12B:
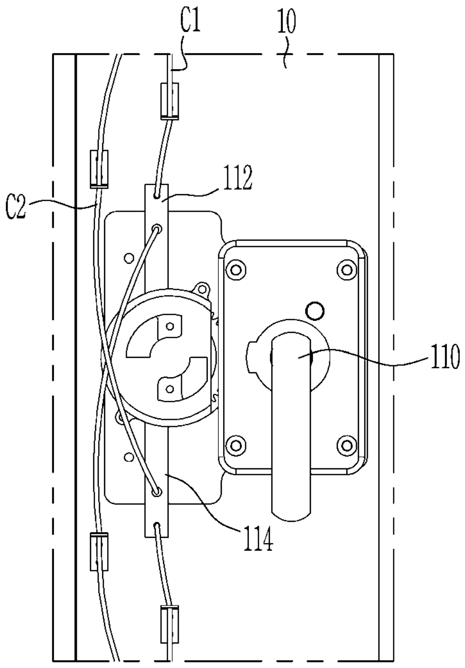
Figure 12C:
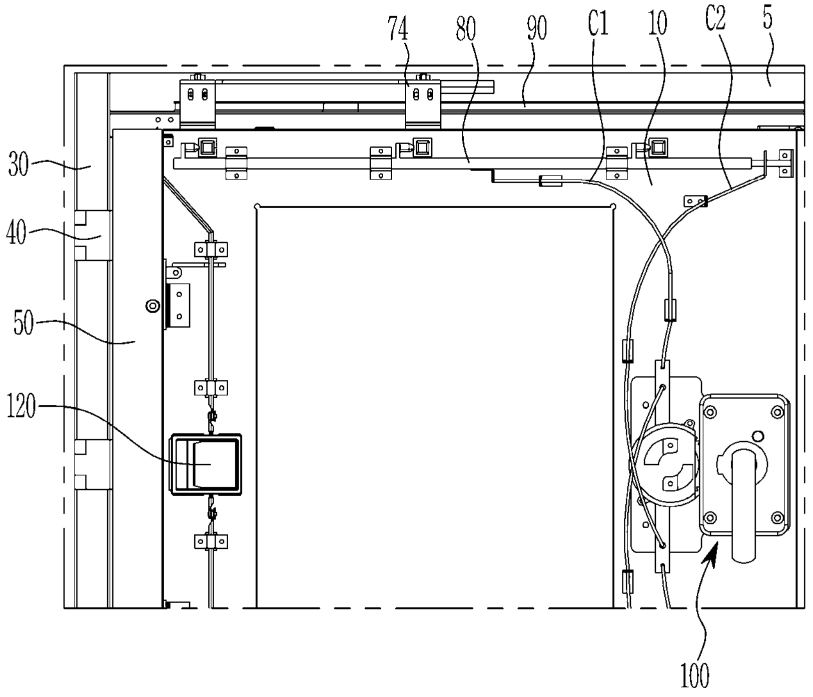
Figure 12D:
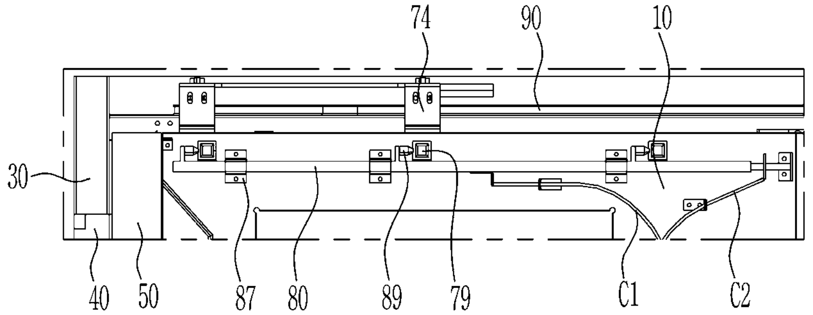
Figure 12E:
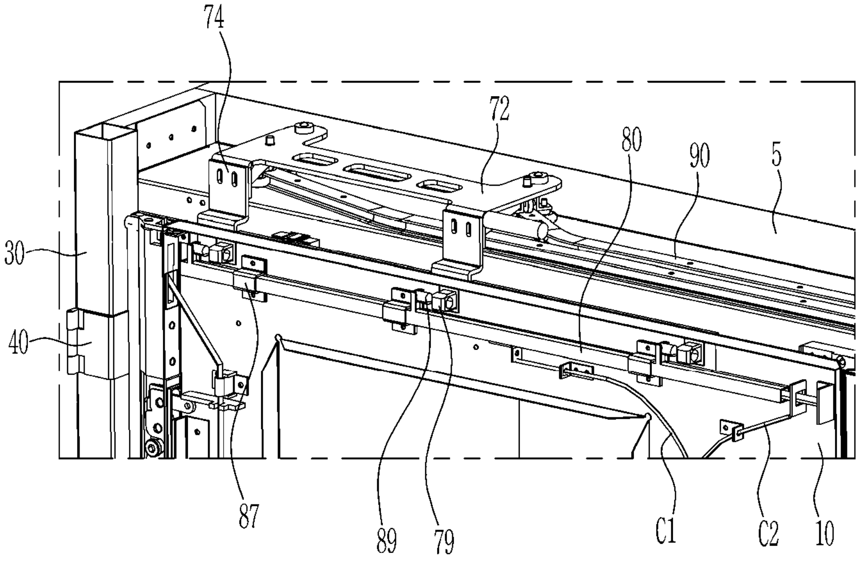
Figure 12F:
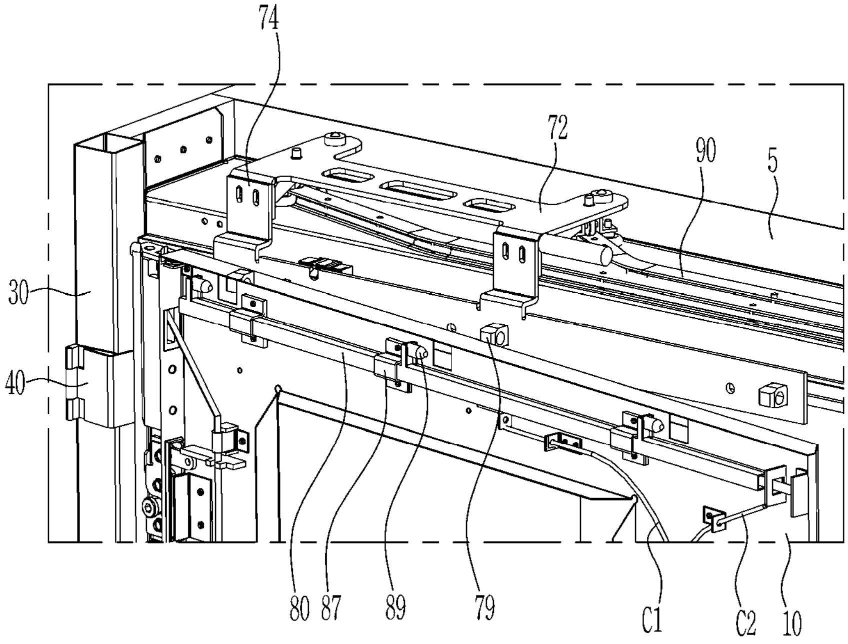
Figure 12G:
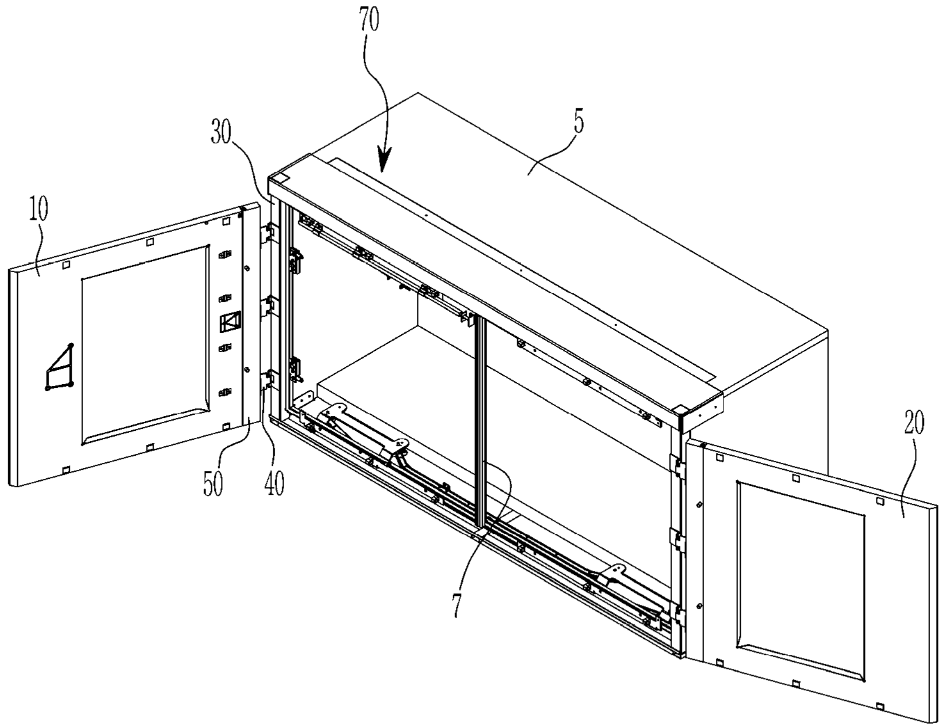

When a handle 110 of the swing handle portion 100 is rotated, the cable C1 at the right side is moved upward and the cable C2 at the left side is moved downwards by movements of the cable connection bars 112 and 114 (FIG. 12B). The door fixing bar 80 and 85 are moved leftward by the movements of the cables C1 and C2 (FIGS. 12C and 12D) so that the locking pins 86 and 89 provided on the door fixing bar 80 and 85 are released from the locking pinholes 79 and 88 provided in the door arm sliding assemblies 70 and 75 (FIG. 12E). As the first and second doors 10 and 20 are decoupled from the door arm sliding assemblies 70 and 75, the first and second doors 10 and 20 may swing (FIGS. 12F and 12G).

Figure 12H:
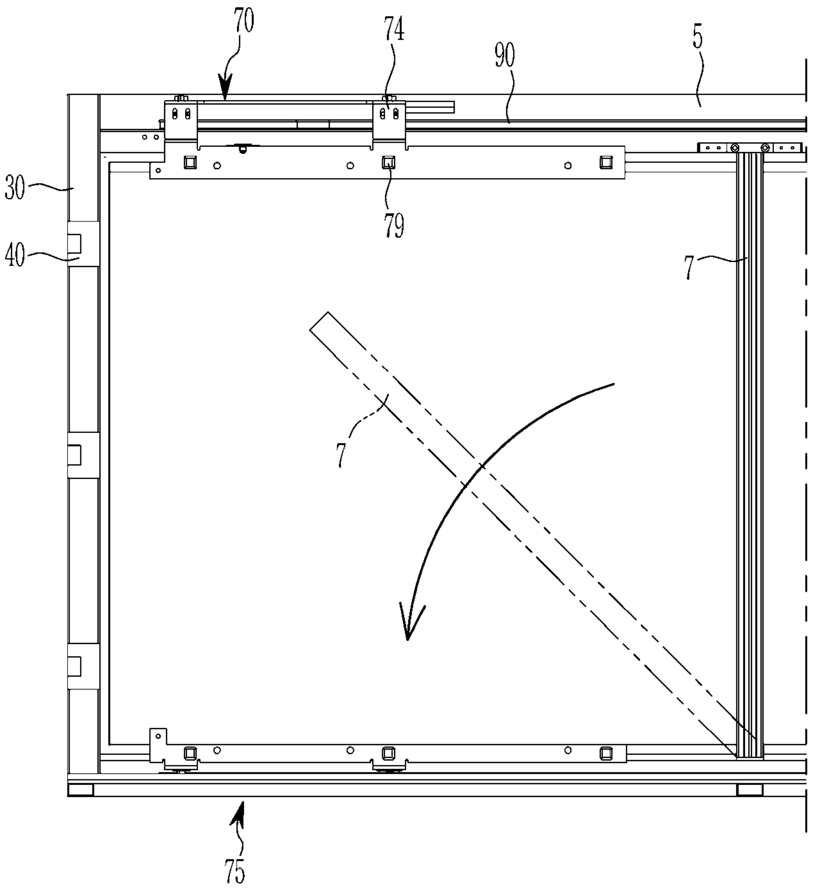

After the first and second doors 10 and 20 swing, the B-pillar 7 provided on the center portion of the chassis cab 5 is fixed by being rotated to the lower side of the chassis cab 5 or separated from the chassis cab 5 so that an opening width of the chassis cab 5 may be maximized (FIG. 12H).

Meanwhile, to slide each of the first and second doors 10 and 20, the swing handle portion 100 is rotated to be disposed in a horizontal direction so that the cable C1 at the right side is moved downward, and the cable C2 at the left side is moved upwards. The door fixing bars 80 and 85 are moved rightward, and the locking pins 86 and 89 are coupled to the locking pinholes 79 and 88 so that each of the first and second doors 10 and 20 is kept connected to the door arm sliding assemblies 70 and 75, and the first and second doors 10 and 20 may slide.

FIG. 13A, FIG. 13B, FIG. 13C, FIG. 13D, FIG. 13E, FIG. 13F, FIG. 13G, FIG. 13H and FIG. 13I are views exemplarily illustrating a process in which the door of the sliding door device for a vehicle according to the exemplary embodiment of the present disclosure slides.

Figure 13A:
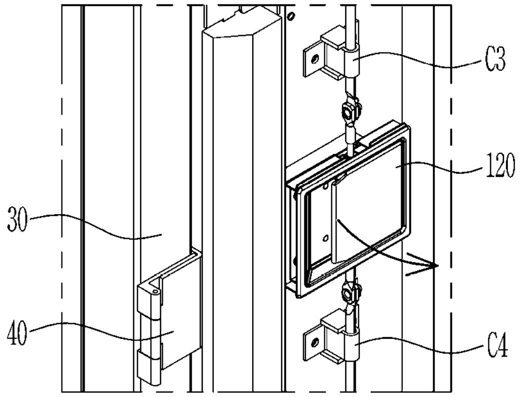
FIG. 13A, FIG. 13B, FIG. 13C, FIG. 13D, FIG. 13E, FIG. 13F, FIG. 13G, FIG. 13H and FIG. 13I are views exemplarily illustrating a process in which the door of the swing/sliding door device for a vehicle according to the exemplary embodiment of the present disclosure slides.

With reference to FIG. 13A, FIG. 13B, FIG. 13C, FIG. 13D, FIG. 13E, FIG. 13F, FIG. 13G, FIG. 13H and FIG. 13I, the first and second doors 10 and 20 may include the sliding handle portions 120 that operate the first and second doors 10 and 20 so that the first and second doors 10 and 20 may swing or may not swing. Furthermore, the first and second doors 10 and 20 may include the hinge catchers 122 that operate so that the first and second doors 10 and 20 are fixed to or released from the door frame 50 in conjunction with the operations of the sliding handle portions 120. Furthermore, the cables C3 and C4, to which tension is applied by operation of the sliding handle portion 120, may be connected to the sliding handle portion 120. The cables C3 and C4 are connected to the hinge catcher 122 (FIG. 13A).

Figure 13B:
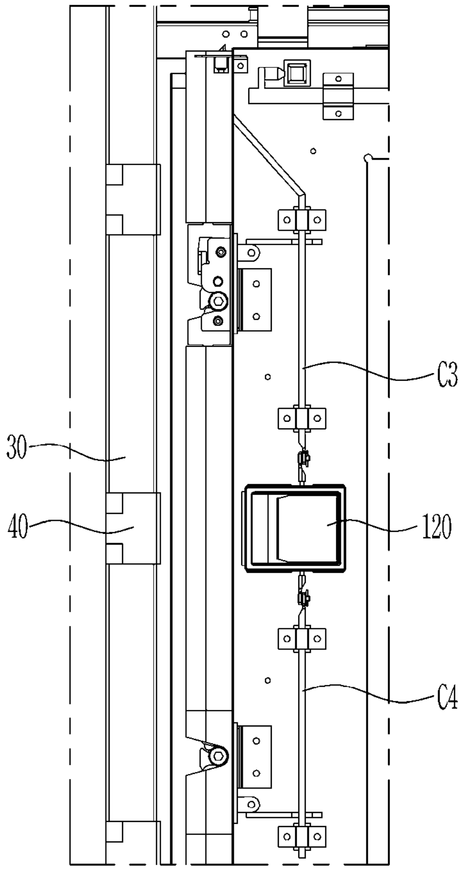
Figure 13C:
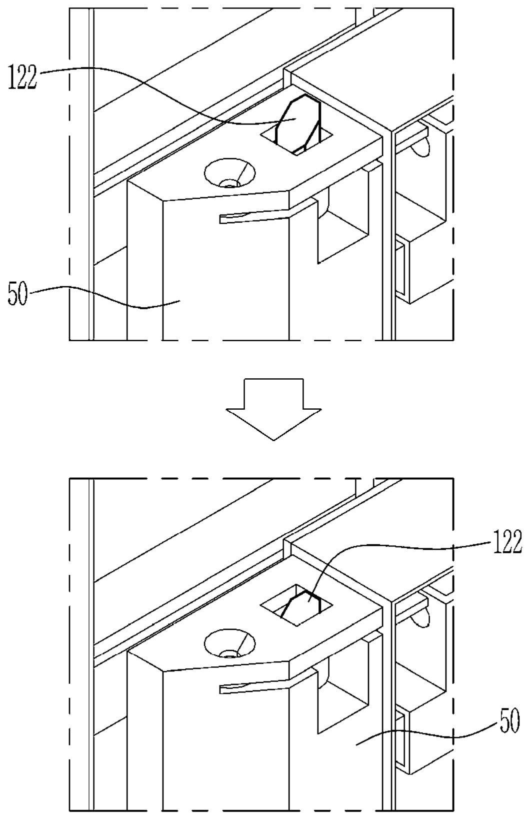

When the sliding handle portion 120 is operated, the cable C3 at the upper side of the sliding handle portion 120 is moved downward, and the cable C4 at the lower side of the sliding handle portion 120 is moved upward (FIG. 13B). Therefore, the hinge catcher 122 is pulled, and the hinge catcher 122 is decoupled from the door frame 50 (FIG. 13C).

Figure 13D:
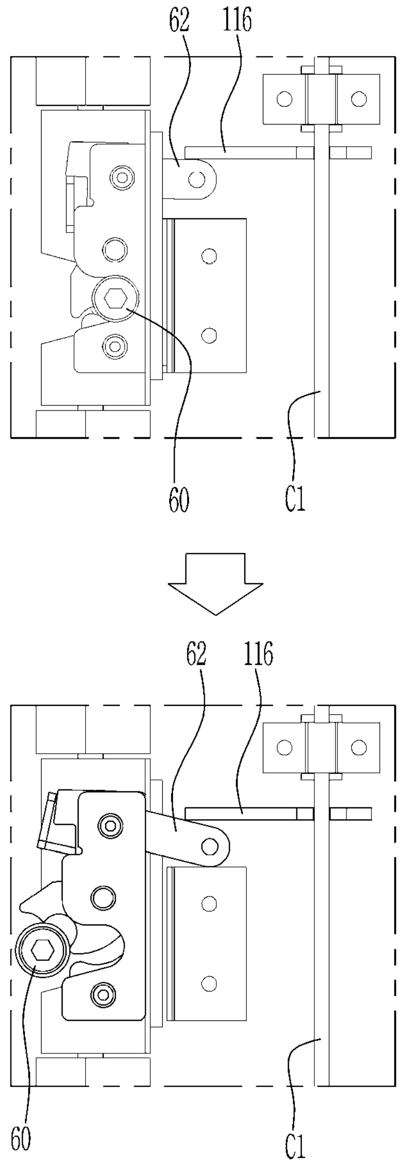
Figure 13E:
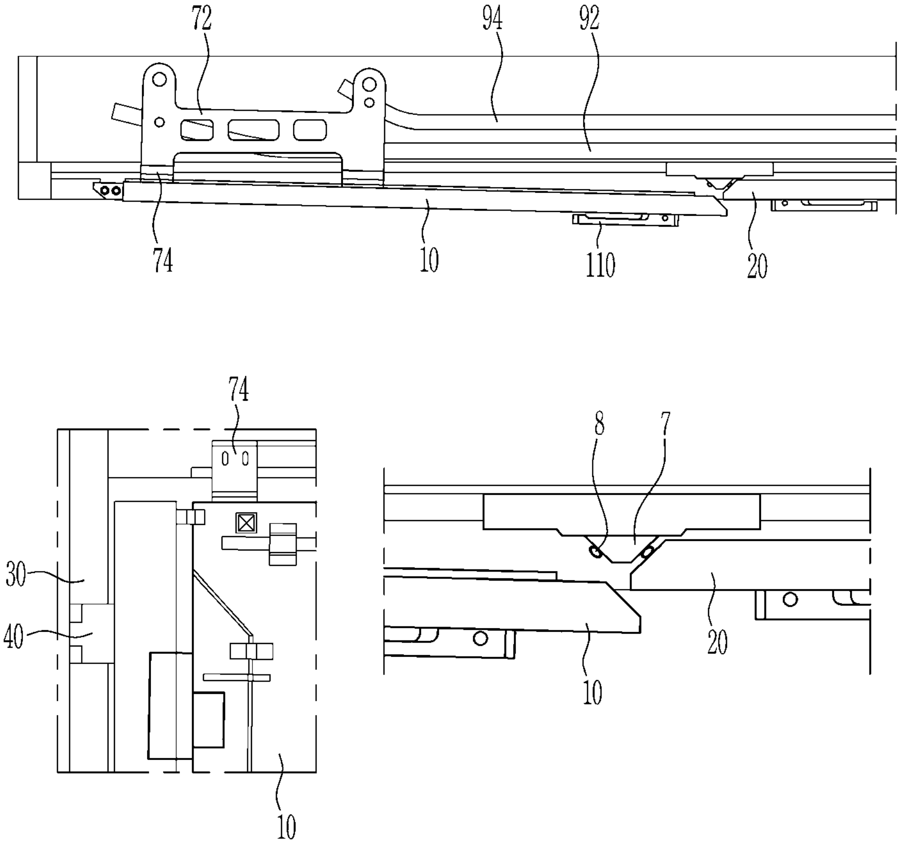
Figure 13F:
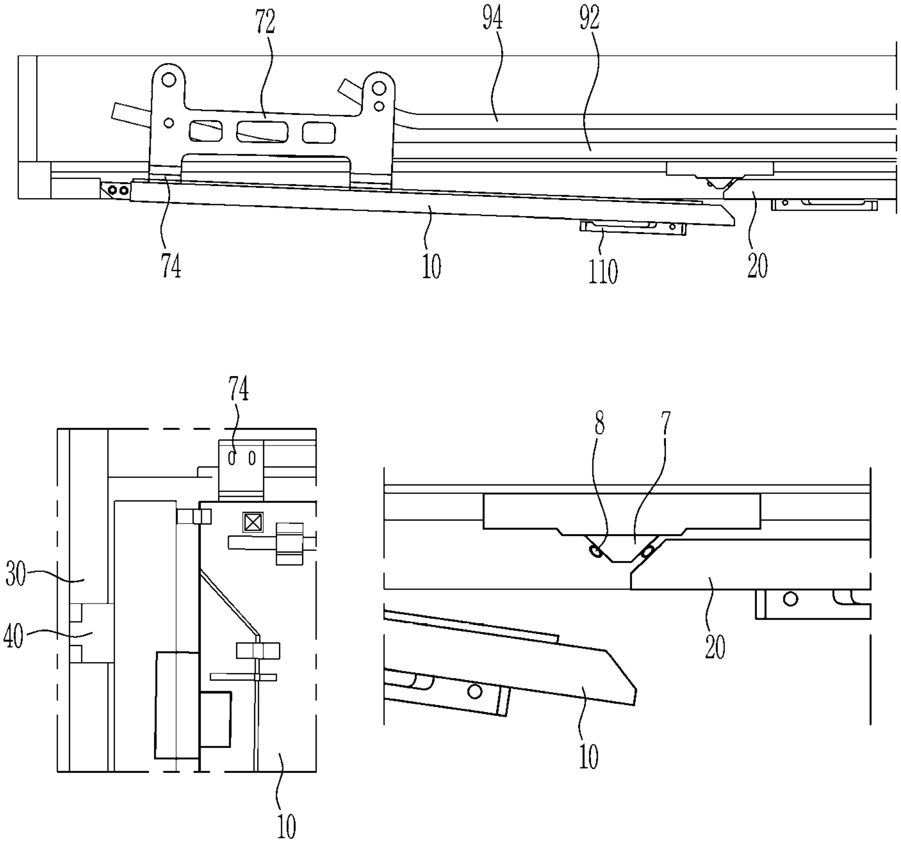
Figure 13G:
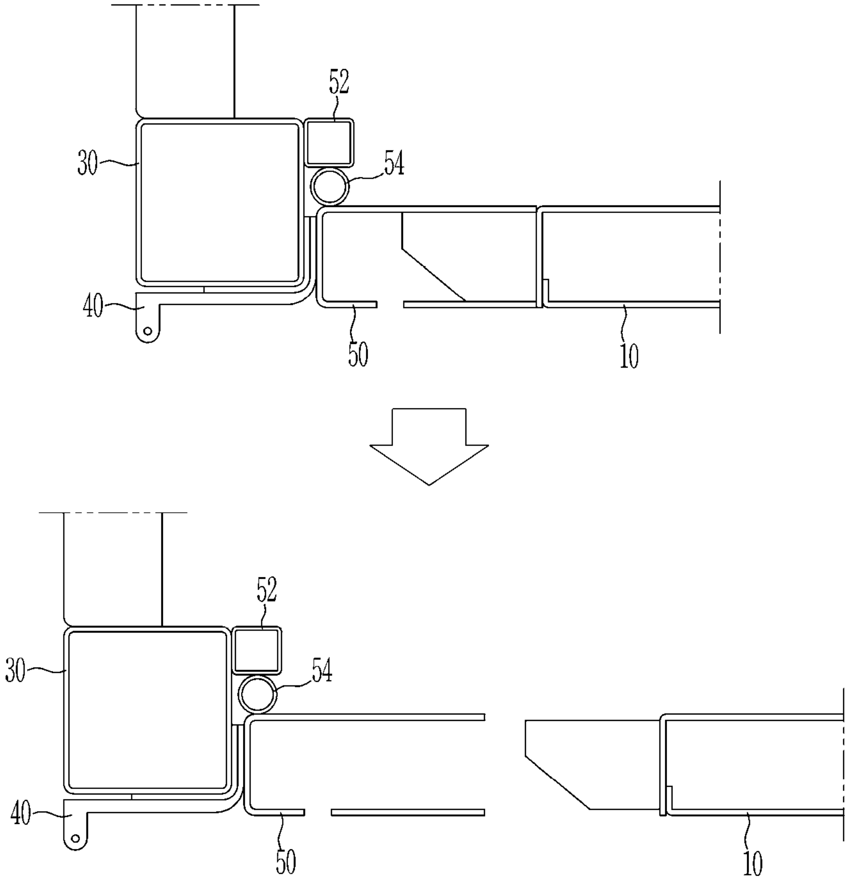
Figure 13H:
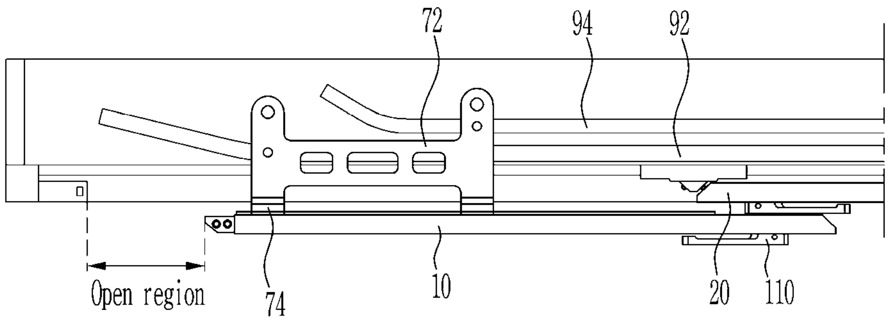
Figure 13I:
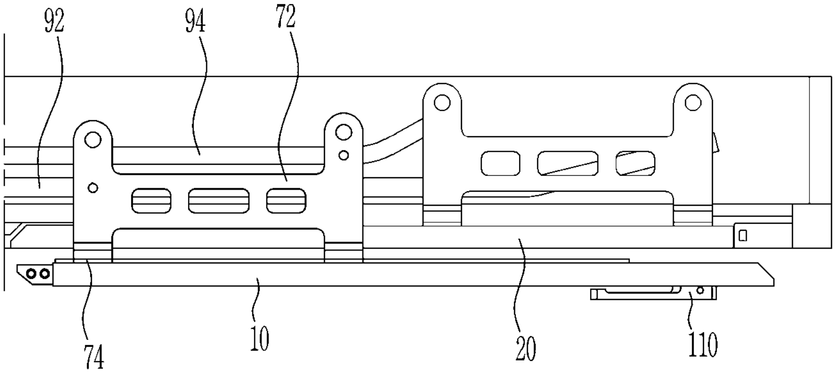

Furthermore, a lever 116 is provided on the cables C3 and C4. The lever 116 is brought into contact with the door striker 62 by the movements of the cables C3 and C4 and rotates the door striker 62 so that the door striker 62 may be decoupled from the door latch 60 (FIG. 13D). When the cables C3 and C4 are moved, the lever 116 also moves in the same direction, and the lever 116 comes into contact with and pushes the door striker 62 provided on the door frame 50. In the instant case, the door striker 62 is rotated and decoupled from the door latch 60 provided on each of the doors 10 and 20. Therefore, the first and second doors 10 and 20 and the door frames 50 are decoupled, and the first and second doors 10 and 20 may slide.

Because the door arm sliding assemblies 70 and 75 and the doors 10 and 20 are kept coupled, the first and second doors 10 and 20 slide when the door arm sliding assemblies 70 and 75 move along the sliding rails 90, 92, 93, 94, 96, and 98. Because the sliding rails 90, 92, 93, 94, 96, and 98 each include a shape curved rearward toward the cab frame 30, the doors 10 and 20 turn to protrude toward the outside of the vehicle body and then move rectilinearly as the doors 10 and 20 slide toward the B-pillar 7. When any one of the first and second doors 10 and 20 slides, one door may move to overlap the front surface the other door. In the instant case, the end portion of each of the doors 10 and 20 may be separated from the door seal 8, and thus each of the doors 10 and 20 may be decoupled from the B-pillar 7 (FIGS. 13E to 13I).

According to the exemplary embodiment of the present disclosure as described above, the door, which may slide and swing, is applied to the vehicle including the chassis cab configured for storing items. Therefore, the door open regions may be diversified, and the door opening width may be maximized so that items with various sizes may be loaded or unloaded, improving the usability.

Furthermore, the door may slide along the sliding rail including a curved shape, which may minimize a loss of the item storage space in the chassis cab and allow the item storage space to store a larger number of items.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A swing and sliding door apparatus provided at a lateral side of a chassis cab of a vehicle to selectively swing or slide and configured to open or close an opening formed in the chassis cab, the swing and sliding door apparatus comprising:

- a sliding rail provided on at least one of upper and lower portions of the chassis cab;
- doors hingedly and rotatably connected to cab frames, respectively, provided on a first side portion and a second side portion of the chassis cab, the doors being connected to be slidable in a longitudinal direction of the vehicle along the sliding rail so that the doors overlap each other;
- door frames provided at positions corresponding to the cab frames and configured to be coupled to or decoupled from an end portion of the doors; and
- door arm sliding assemblies provided on the upper or lower portion of the chassis cab and configured to be coupled to or decoupled from the doors, wherein the door arm sliding assemblies are slidable along the sliding rail,
- wherein the cab frames include door hinges connected to the door frames, respectively, and
- wherein the door frames hingedly rotate relative to the cab frames by the door hinges.

2. The swing and sliding door apparatus of claim 1,

- wherein each door frame includes a door striker, and
- wherein each door includes a door latch provided at a position corresponding to the door striker and configured to be coupled to or decoupled from the door striker.

3. The swing and sliding door apparatus of claim 1, wherein each door includes a swing handle portion that operates a corresponding door so that the corresponding door swings about a corresponding cab frame or does not swing.

4. The swing and sliding door apparatus of claim 3, wherein each door includes a hinge catcher that operates so that the hinge catcher of the corresponding door is coupled to or decoupled from the corresponding door frame in conjunction with an operation of a sliding handle portion.

5. The swing and sliding door apparatus of claim 4, wherein a cable is connected to the hinge catcher, and the cable moves the hinge catcher in a direction perpendicular to a longitudinal direction of a vehicle body when tension is applied to the cable by operation of the sliding handle portion.

6. The swing and sliding door apparatus of claim 2,

- wherein the cable includes a lever, and
- wherein the lever comes into contact with and rotates the door striker when the cable moves toward a lower side of the vehicle so that the door striker is decoupled from the door latch.

7. The swing and sliding door apparatus of claim 1, wherein each door arm sliding assembly includes:

- a door arm configured to move along the sliding rail; and
- a door arm bracket connected to the door arm and configured to be fixed to or released from a corresponding door.

8. The swing and sliding door apparatus of claim 7, wherein a door roller is provided on a lower surface of the door arm and configured to come into contact with the sliding rail and roll in accordance with a sliding motion of the corresponding door.

9. The swing and sliding door apparatus of claim 1,

- wherein the sliding rail is provided as a pair of sliding rails, and
- wherein the sliding rail includes a shape curved rearward toward the cab frames.

10. The swing and sliding door apparatus of claim 1, wherein each door includes a sliding handle portion that operates a corresponding door so that the corresponding door slides along the sliding rail or does not slide.

11. The swing and sliding door apparatus of claim 10, wherein each door includes a door fixing bar configured to move in a longitudinal direction of a vehicle body so that the corresponding door is fixed to or released from a corresponding door arm sliding assembly in conjunction with an operation of a swing handle portion.

12. The swing and sliding door apparatus of claim 11, wherein a cable is connected to the door fixing bar, and the cable moves the door fixing bar in the longitudinal direction of the vehicle body when tension is applied to the cable by operation of the swing handle portion.

13. The swing and sliding door apparatus of claim 12, wherein the door fixing bar includes a plurality of locking pins, and the plurality of locking pins is coupled to or decoupled from the corresponding door arm sliding assembly by a movement of the door fixing bar.

14. The swing and sliding door apparatus of claim 13, wherein the plurality of locking pins is inserted into or released from a locking pinhole provided in a door arm bracket of the corresponding door arm sliding assembly.

15. A swing and sliding door apparatus provided at a lateral side of a chassis cab of a vehicle to selectively swing or slide and configured to open or close an opening formed in the chassis cab, the swing and sliding door apparatus comprising:

- a first door hingedly and rotatably connected to a cab frame provided on a first side portion of the chassis cab, the first door being connected to be slidable along sliding rails provided on upper and lower portions of the chassis cab;
- a second door hingedly and rotatably connected to a cab frame provided on a second side portion of the chassis cab, the second door being connected to be slidable along sliding rails provided on the upper and lower portions of the chassis cab;
- door strikers provided on door frames provided at positions corresponding to the cab frames;
- door latches provided at positions corresponding to the door strikers and provided on the first and second doors, the door latches being coupled to or decoupled from the door strikers;
- door arm sliding assemblies provided on the upper or lower portion of the chassis cab and configured to be coupled to or decoupled from the first and second doors, the door arm sliding assemblies being provided to be slidable along the sliding rails; and
- door fixing bars configured to move in a longitudinal direction of a vehicle body so that the first and second doors are fixed to or released from the door arm sliding assemblies,
- wherein each cab frame includes a door hinge connected to a corresponding door frame, and wherein each door frame hingedly rotates relative to a corresponding cab frame by the door hinge.

16. The swing and sliding door apparatus of claim 15, wherein the first and second doors include:

swing handle portions configured to operate the first and second doors so that the first and second doors slide along the sliding rails or do not slide; and sliding handle portions configured to operate the first and second doors so that the first and second doors swing about the cab frames or do not swing.

17. The swing and sliding door apparatus of claim 16, wherein a B-pillar is provided on a center portion of the chassis cab, and the B-pillar extends in an upward/downward direction of the vehicle body and is configured to be detached from the chassis cab or rotate.

18. The swing and sliding door apparatus of claim 17, wherein end portions of the first and second doors, which face each other, are coupled to the B-pillar with a door seal interposed therebetween.

* * * * *